(12) United States Patent
Song

(10) Patent No.: US 7,195,352 B2
(45) Date of Patent: Mar. 27, 2007

(54) ARRANGEMENT OF EYEGLASSES AND LASER GENERATOR CIRCUIT ASSEMBLY

(76) Inventor: Liaw Yu Song, 3F, No.206-3, SEC.5, Roosevelt RD., Taipei (TW)

( * ) Notice: Subject to any disclaimer, the term of this patent is extended or adjusted under 35 U.S.C. 154(b) by 0 days.

(21) Appl. No.: 11/200,055

(22) Filed: Aug. 10, 2005

(65) Prior Publication Data

US 2006/0103805 A1    May 18, 2006

(30) Foreign Application Priority Data

Nov. 18, 2004  (CN) .......................... 2004 9 3218519

(51) Int. Cl.
*G02C 1/00* (2006.01)
(52) U.S. Cl. ........................................ 351/158; 351/41
(58) Field of Classification Search ................ 351/158, 351/41; 362/105, 253
See application file for complete search history.

(56) References Cited

U.S. PATENT DOCUMENTS

| 5,182,585 | A | * | 1/1993 | Stoner ......................... 351/41 |
| 5,184,156 | A | * | 2/1993 | Black et al. ................. 351/158 |
| 5,412,439 | A | * | 5/1995 | Horn ............................ 351/45 |
| 5,954,507 | A | * | 9/1999 | Rod et al. ..................... 434/19 |
| 6,808,284 | B1 | * | 10/2004 | Chao ........................... 362/105 |

* cited by examiner

*Primary Examiner*—Hung Xuan Dang
(74) *Attorney, Agent, or Firm*—Birch, Stewart, Kolasch & Birch, LLP.

(57) ABSTRACT

An arrangement of eyeglasses and laser generator circuit assembly is disclosed to include a laser generator installed in the frame of a pair of eyeglasses between the two rims, a battery cell mounted in one temple of the pair of eyeglasses, and two sets of metal contacts respectively installed in one temple and one rim of the pair of eyeglasses and respectively electrically connected to the battery cell and the laser generator for closing the circuit between the battery cell and the laser generator to cause the laser generator to emit a laser beam when the user wears the pair of eyeglasses.

2 Claims, 3 Drawing Sheets

ARRANGEMENT OF EYEGLASSES AND LASER GENERATOR CIRCUIT ASSEMBLY

BACKGROUND OF THE INVENTION

1. Field of the Invention

The present invention relates to eyeglasses and more particularly, to an arrangement of eyeglasses and laser generator circuit assembly, which has a laser generator circuit assembly installed in the frame of the eyeglasses between the two rims for generating a laser beam for aiming at an object when the user wearing the eyeglasses.

2. Description of the Related Art

A pair of eyeglasses generally comprises two rims joined together to hold a respective lens, and two temples respectively pivotally connected to the rims. Each rim is a split ring having two lugs respectively welded to the two ends thereof. Each lug has a screw hole. After mounting of a lens in one rim, the two lugs of the rim are attached together, and then a screw is threaded into the screw hole of each of the two lugs to secure the two lugs together. Conventional eyeglasses are adapted to help the user see better, or to protect the user's eyes against the light of the sun. However, conventional eyeglasses cannot help the user to aim the eyes at an object. For example, when playing pocket billiards, the eyeglasses cannot help the user to user to aim the eyes at the object ball; when playing golf, the eyeglasses cannot help the user to estimate the distance and angle between the ball and the hole.

SUMMARY OF THE INVENTION

The present invention has been accomplished under the circumstances in view. According to one aspect of the present invention, the eyeglasses has a laser generator installed in the frame between the two rims thereof, a power source installed in one temple thereof, a set of first metal contacts installed in the temple and electrically connected to the power source, and a set of second metal contacts installed in one rim adjacent to the set of first metal contacts. The first metal contacts and the second metal contacts are electrically connected together to transmit electric power from the power source to the laser generator when the user extend out the temples and wears the eyeglasses, thereby driving the laser generator to generate a laser beam for pointing an object. According to another aspect of the present invention, an on/off switch is installed in the frame and electrically connected between the power source and the laser generator for enabling the user to switch on/off the laser generator manually.

DETAILED DESCRIPTION OF THE PREFERRED EMBODIMENT

Figure 1:
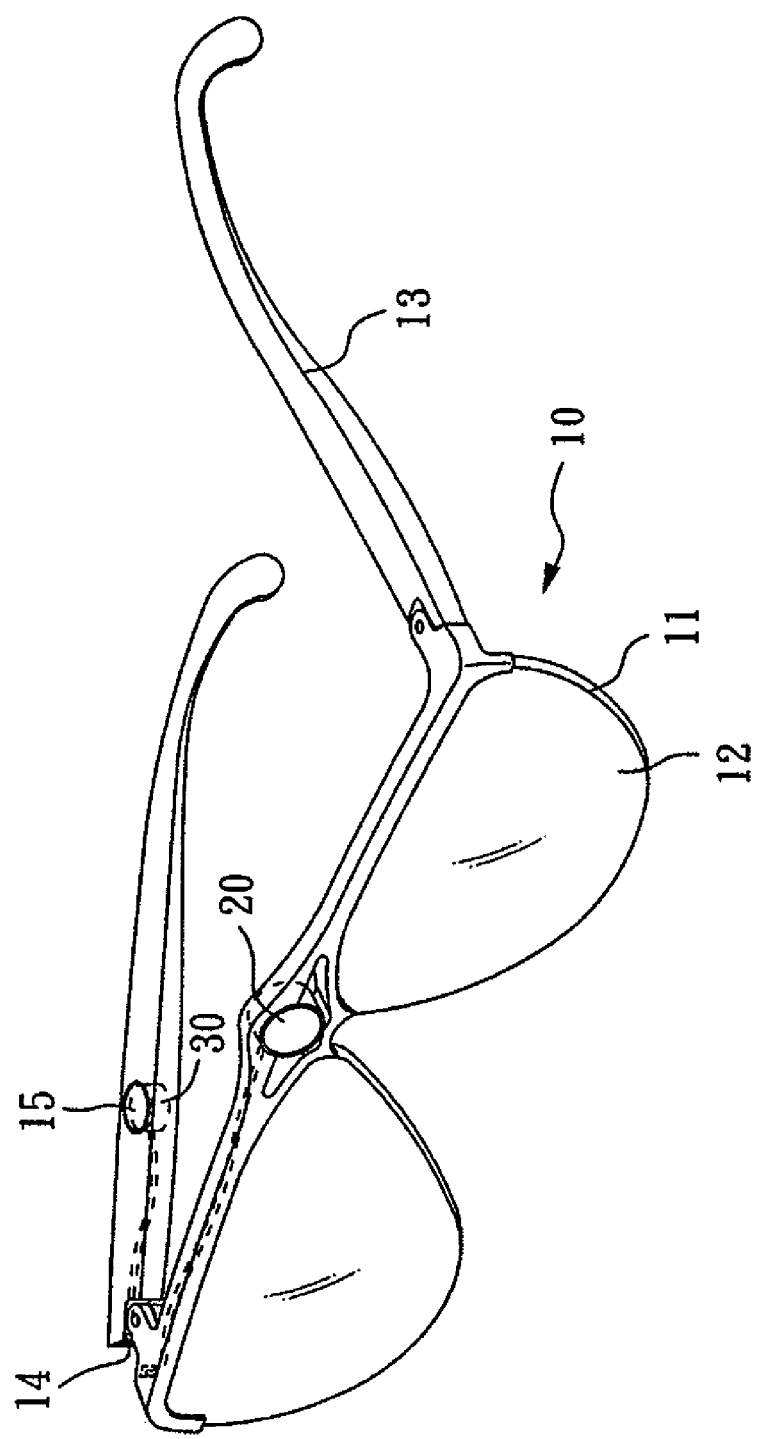
FIG. 1 is a schematic perspective view of a pair of eyeglasses according to the present invention.
Figure 2:
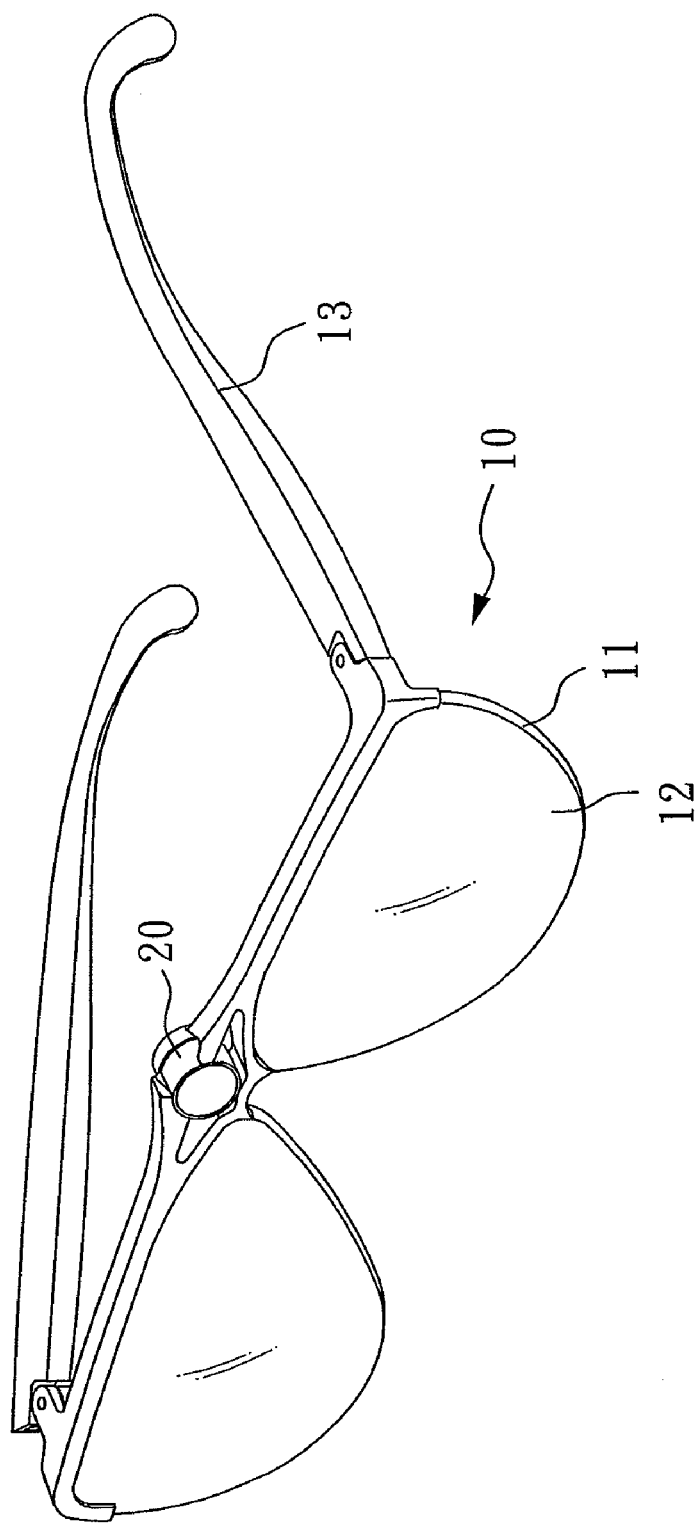
FIG. 2 is a schematic perspective view of an alternate form of the present invention.

Referring to FIGS. 1 and 2, a pair of eyeglasses in accordance with the present invention is shown comprising a frame 10. The frame 10 can be made of any of a variety of materials in any of a variety of shapes, comprising two rims 11 that hold a respective lens 12. A laser generator 20 is mounted in the frame 10 between the rims 11 (according to this embodiment, the laser generator 20 is installed in the bridge of the frame 10 between the rims 11).

The frame 10 further comprises two temples 13 respectively pivotally connected to the rims 11 in such a manner that the temples 13 can be turned relative to the rims 11 between a first position, namely, the operative position where the temples 13 are kept substantially perpendicular to the rims 11 for securing the eyeglasses to the user's head, and a second position, namely, the non-operative position where the temples 13 are closely attached together at one side of the rims 11. A power source, for example, a battery cell 30 is installed in one temple 13. Metal contacts 14 are respectively installed in one temple 13 and the respective rim 11. The metal contacts 14 at the temple 13 are electrically connected to the power source 30. The metal contacts 14 at the rim 11 are electrically connected to the laser generator 20. Further, an on/off switch 15 is installed in the temple 13 carrying the power source 30 and electrically connected between the power source 30 and the laser generator 20. When switched on the on/off switch 15, electric power is transmitted from the power source 30 to the laser generator 20, thereby causing the laser generator 20 to emit a laser beam.

Figure 3:
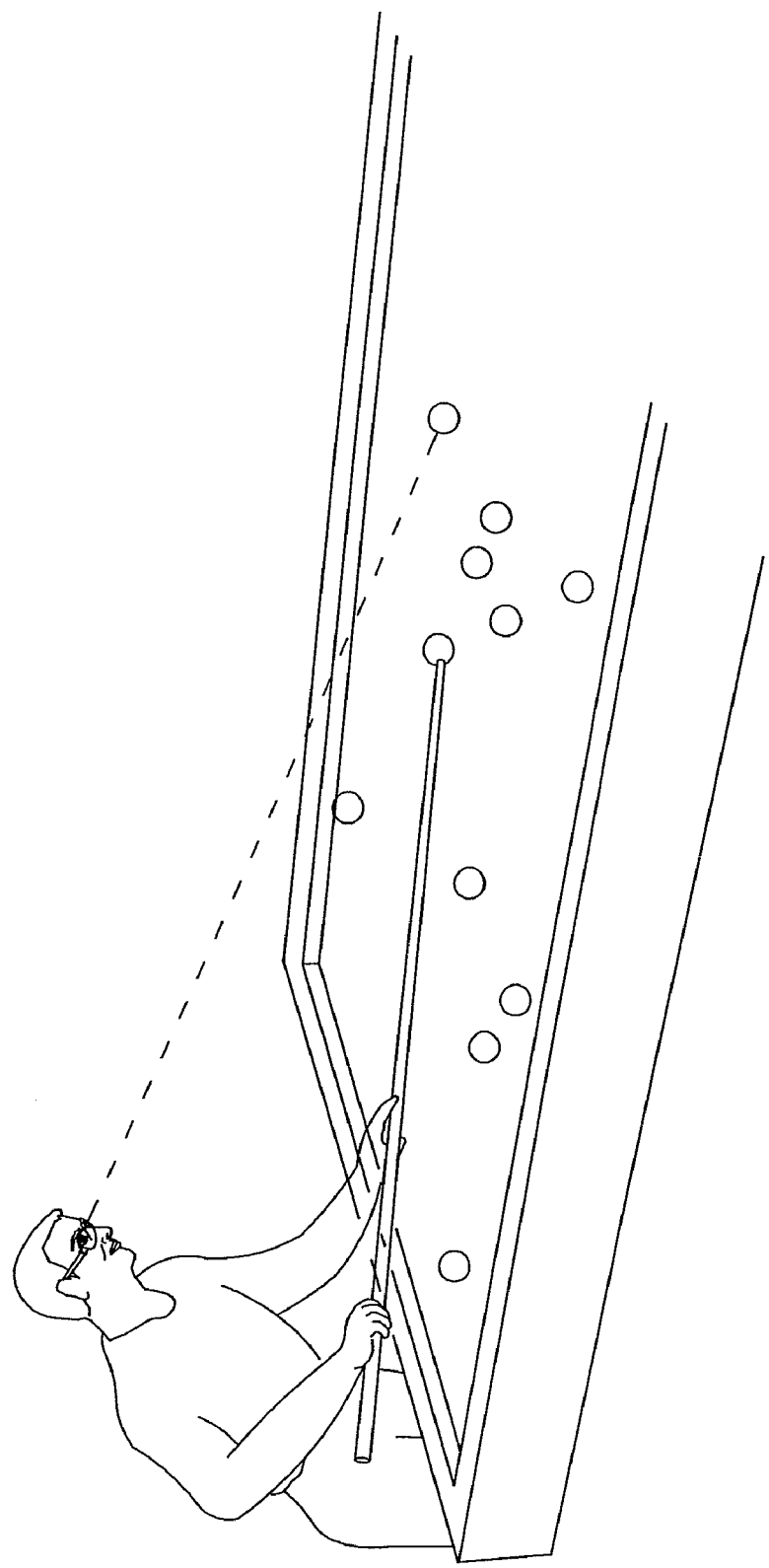
FIG. 3 shows an application example of the present invention.

Referring to FIG. 3 and FIGS. 1 and 2 again, when extended out the temples 13 from the non-operative position to the operative position, the metal contacts 14 at the temple 13 are forced into contact with the metal contacts 14 at the rim 11. When the user put the eyeglasses on the head and switched on the on/off switch 15, the laser generator 20 is driven to emit a laser beam for aiming. For example, when playing pocket billiards, the user can use the laser beam generated by the laser generator 20 to help aiming the cue ball at the object ball.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An arrangement of eyeglasses and laser generator circuit assembly comprising a pair of eyeglasses and a laser generator circuit assembly installed in said eyeglasses, said pair of eyeglasses comprising a frame, said frame comprising a first rim and a second rim connected side by side, two lenses respectively mounted in said rims, a first temple pivotally connected to said first rim, and a second temple pivotally connected to said second rim, said first temple and said second temple being respectively turnable relative to said first rim and said second rim between a non-operative position and an operative position, wherein laser generator circuit assembly comprises a power source installed in said first temple, a set of first metal contacts installed in one end of said first temple adjacent to said first rim and electrically connected to said power source, a laser generator installed in said frame between said first rim and said second rim and adapted to generate a laser beam, and a set of second metal contacts installed in said first rim adjacent to said first temple and electrically connected to said laser generator for the contact of said set of first metal contacts to transmit electric power from said power source to said laser generator when said first temple is turned outwards from said non-operative position to said operative position.

2. The arrangement of eyeglasses and laser generator circuit assembly as claimed in claim 1, wherein said laser generator circuit assembly further comprises an on/off switch electrically connected between said power source and said laser generator and adapted to close/open the circuit between said power source and said laser generator.

* * * * *